(12) United States Patent
Neff et al.

(10) Patent No.: US 6,710,096 B2
(45) Date of Patent: Mar. 23, 2004

(54) POLYETHER POLYOL FOR FOAM APPLICATIONS

(75) Inventors: Raymond A. Neff, Northville, MI (US); Duane A. Heyman, Monroe, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 10/200,650

(22) Filed: Jul. 22, 2002

(65) Prior Publication Data

US 2004/0014829 A1 Jan. 22, 2004

(51) Int. Cl.$^7$ ............................................... C08G 18/28
(52) U.S. Cl. .................... 521/174; 252/182.27; 521/175
(58) Field of Search ................................. 521/174, 175; 252/182.27

(56) References Cited

U.S. PATENT DOCUMENTS

| | | |
|---|---|---|
| 3,277,213 A | 10/1966 | Hamden |
| 3,459,731 A | 8/1969 | Gramera et al. |
| 3,600,338 A | 8/1971 | Molotsky |
| 3,743,621 A | 7/1973 | Molotsky |
| 4,111,865 A | 9/1978 | Seefried, Jr. et al. |
| 4,197,372 A | 4/1980 | Hostettler |
| 4,380,502 A | 4/1983 | Muller et al. |
| 4,408,041 A * | 10/1983 | Hirao et al. ............... 536/4.1 |
| 4,445,938 A | 5/1984 | Verwaerde et al. |
| 4,585,858 A | 4/1986 | Molotsky |
| 4,883,825 A | 11/1989 | Westfall et al. |
| 4,917,916 A * | 4/1990 | Hirao et al. ............... 426/658 |
| 5,206,325 A | 4/1993 | Hata et al. |
| 5,340,916 A | 8/1994 | Henn et al. |
| 5,521,226 A | 5/1996 | Bleys |
| 5,549,841 A | 8/1996 | Kinkelaar et al. |
| 5,594,097 A | 1/1997 | Chaffanjon et al. |
| 5,652,279 A | 7/1997 | Hager et al. |
| 5,668,191 A | 9/1997 | Kinkelaar et al. |
| 5,690,855 A | 11/1997 | Nichols et al. |
| 6,034,197 A | 3/2000 | Mahon et al. |

FOREIGN PATENT DOCUMENTS

| | | |
|---|---|---|
| DE | 198 24 134 A1 | 12/1999 |
| GB | 989921 | 4/1965 |

OTHER PUBLICATIONS

PCT International Report Dated Apr. 24, 2003.
Abstract of DE 19824134.
Roquette Brochure, Turning Nature to Advantage, pp. 1–24, 1990.
Roquette Brochure, Polyols—Sorbitol–Maltitol–Mannitol–Xylitol, pp. 1–25, 1993.
Chem Abstract of FR 2707649–A1.
"A New Generation of High–Productivity Polyols for HR Molded Foams," by K.N. Khameneh, J.P. Cosman, and D.G. Hunter, 35$^{th}$ Annual Polyurethane Technical/Marketing Conference, Oct. 9–12, 1994, pp. 253–260.

* cited by examiner

Primary Examiner—John M. Cooney, Jr.
(74) Attorney, Agent, or Firm—Fernando A. Borrego; Mary K. Cameron

(57) ABSTRACT

Polyols initiated with a first initiator having a relatively high functionality averaging greater than eight and comprising a range of species of different functionality, and optionally a second initiator, having low functionality, i.e. a two to eight nominal functionality initiator molecule. Another aspect of the invention is a process for making the polyol. The invention is also directed to a process for producing polyurethane foam by reacting the polyol of the invention with isocyanates, and the foam produced thereby.

21 Claims, 1 Drawing Sheet

POLYETHER POLYOL FOR FOAM APPLICATIONS

FIELD OF THE INVENTION

The invention is directed to polyols based on a first initiator having a relatively high functionality, averaging greater than eight, and optionally a second initiator, having low functionality, i.e. a two to eight nominal functionality initiator molecule. Another aspect of the invention is a process for making the polyols. The invention is also directed to a process for producing polyurethane foam by reacting a polyol of the invention with isocyanates, and the foam produced thereby.

BACKGROUND OF THE INVENTION

The production of polyurethane foams by reacting polyisocyanates with isocyanate-reactive compounds, for example polyether polyols, hereinafter also referred to generally as polyetherols, and, if desired, chain extenders and/or crosslinkers in the presence of catalysts, blowing agents and, if desired, flame retardants, auxiliaries and/or additives is generally known. See U.S. Pat. Nos. 4,554,295; 4,810,729; 5,143,941; 5,260,347; 5,290,823; 5,830926; and 6,228,899; the disclosures of which are incorporated herein by reference.

Characteristics of polyurethane foams, such as flexibility, rigidity, density, hardness, strength and elongation properties, can be adjusted by altering the starting materials, reactant ratios and other reaction parameters. Altering the polyether polyols used to form polyurethane foam is a well-known means of changing foam characteristics. The choice of initiators, and in particular the functionality of initiators, is known to affect the resulting polyol and, consequently, the characteristics of the foams made therefrom.

Conventionally, rigid polyurethane foams are made from polyols having a nominal functionality of two to eight. It is desirable to make rigid polyurethane foams from isocyanate-reactive compounds having functionality greater than eight to achieve improved properties such as rigidity, density and dimensional stability. However, previous attempts to make polyols of functionality greater than eight have encountered difficulties rendering their industrial manufacture impractical. In particular, initiators of functionality greater than eight are often difficult-to-process solids and may be prohibitively expensive for use on an industrial scale for making polyols. Polyols based on higher functionality initiators also disadvantageously tend to have high viscosity and/or poor filterability. Thus, there is a need for polyols for use in rigid polyurethane foam formation, having a functionality of greater than eight, which are inexpensive and have improved processability.

Flexible polyurethane foams are conventionally made using triol-based polyols having a nominal functionality of three. Flexible foams made from such polyols have adequate hardness, tensile, tear, elongation and compression set performance. A drawback of the triol-based polyols is their generally low reactivity (rate of molecular weight build) relative to current state of the art polyols, such as glycerin/sorbitol co-initiated polyols. The low reactivity results in longer cycle times in making foam, which increases the cost of foam manufacture. It is recognized in the art that higher functionality polyols build molecular weight faster in the polyurethane foam during the reaction, thus effectively providing higher reactivity. To utilize the faster molecular weight building feature of higher functionality polyols, sorbitol- and sucrose-based polyols have been used in conjunction with glycerin-based polyols to form flexible foam. The polyol components resulting from use of the two initiators have a higher reactivity than triol-based polyols and provide greater foam stability.

A drawback of the glycerin/sucrose- and glycerin/sorbitol-based foams is that, while foam hardness is about the same as that of a triol-based foam, the tensile, tear and elongation properties are reduced in foams based upon sucrose or sorbitol polyols. This loss of tensile, tear and elongation properties causes difficulty in fabricating finished articles. Reduction of tensile, tear and elongation also results in reduced performance, particularly durability performance. Thus, there is a need for new polyols, for use in flexible polyurethane foam formation, which provide higher reactivity than a triol-initiated polyol, but which provide the same as or better tensile, tear and elongation properties to the foam.

Attempts have been made to use starch hydrolysates as the initiator for polyols. Starch polymer has been described in the literature many times and is composed of chains of glucose rings linked together by ether bonds. In hydrolyzed starch, the glucose rings comprising the starch polymer molecule remain intact while the polymer is broken into smaller oligomers at the ether bond between glucose rings. Starch hydrolysate can be alkoxylated to form a polyol, but tends to undergo undesirable side reactions during the alkoxylation process. The side reactions are believed to be due to the presence of hemiacetal glucose rings as end units in the oligomers resulting from hydrolysis of the starch polymer. These hemiacetal end units are in equilibrium with the hydroxyaldehyde form of glucose. In the presence of strong base, the hydroxyaldehyde/hemiacetal form of glucose is less stable than the acetal linkages and tends to undergo undesirable side reactions. Typically, in the presence of a strong base, such as the alkali metal or alkaline earth metal oxide bases generally used in catalyzing the alkoxylation reaction to make polyetherols, the hemiacetal ring converts to the hydroxyaldehyde, which then undergoes various side reactions including aldol condensation and Cannizzaro reactions to form by-products. These by-products can cause color changes and other undesirable characteristics in the polyol. Use of hydrolysated starch, unhydrogenated, as an initiator tends to result in polyetherols that are unacceptable for modem polyurethane foam production due to the presence of by-products that are difficult and expensive to remove from the polyol. Thus, there is a need for polyols of functionality greater than eight that are made from inexpensive raw materials and processes without the inclusion of by-products.

It is an object of the invention to provide polyols which overcome the above-described drawbacks of the prior art and to provide polyols, polyol components and polyurethane foam based upon one or more initiators having a molar average functionality of greater than eight.

SUMMARY OF THE INVENTION

The present invention provides a polyether polyol comprising the reaction product of at least one alkylene oxide and at least one first initiator comprising a plurality of species having alkylene oxide reactive hydrogens, wherein the first initiator has a molar average functionality of greater than eight and the plurality comprises in most major part species having a functionality of less than eighteen, and optionally, at least one second initiator having alkylene oxide reactive hydrogens and a nominal functionality of 2 to 8. For purposes of this invention, the term most major part is understood to mean more than 50% and, preferably less than 100%. The plurality may comprise species having a functionality of less than eighteen in an amount greater than 60%, and desirably the amount ranges between 65 and 95%. In one embodiment, the first initiator comprises a hydrogenated starch hydrolysate, which may comprise species each having a nominal functionality of from 6 to about 27, wherein between 80 and 90% of the species have a functionality of less than eighteen.

The invention also provides a polyether polyol comprising the reaction product of at least one alkylene oxide and at least one first initiator having alkylene oxide reactive hydrogens, being substantially free of hydroxyaldehyde functional groups, and having a molar average functionality in the range of greater than eight to less than eighteen, and optionally, at least one second initiator having alkylene oxide reactive hydrogens and a nominal functionality of 2 to 8. In one embodiment, the first initiator comprises a plurality of species. This plurality of species may comprise species each of which has a nominal functionality of six or greater.

Polyols of the invention may comprise about 5 to about 100 wt % of alkoxylated species each having a nominal functionality greater than 8.

In one embodiment, the second initiator has a nominal functionality of 2 to 3. This embodiment also provides polyether polyols wherein about 5 to about 50 wt % of the polyol comprises alkoxylated species each having nominal functionality greater than 8.

The invention further provides a process for making a polyether polyol comprising the steps of providing at least one alkylene oxide and providing an initiator component comprising at least one first initiator having alkylene oxide reactive hydrogens, being substantially free of hydroxyaldehyde functional groups and having a molar average functionality in the range of greater than eight to less than eighteen; and optionally, at least one second initiator having alkylene oxide reactive hydrogens and a nominal functionality of 2 to 8; and reacting the at least one alkylene oxide with the initiator component to form a polyether polyol. Optionally, step c) may be conducted in the presence of a catalyst. In one embodiment, the first initiator comprises a plurality of species each having nominal functionality of six or greater. In another aspect of the invention, the first initiator comprises a hydrogenated starch hydrolysate. In yet another aspect of the invention, the initiators may be blended to form the initiator component before reacting the at least one alkylene oxide with the initiator component.

In a preferred embodiment, a polyether polyol is provided comprising the reaction product of at least one alkylene oxide and at least one first initiator, having alkylene oxide reactive hydrogens, comprising a hydrogenated starch hydrolysate having a molar average functionality of greater than eight, and optionally, at least one second initiator having alkylene oxide reactive hydrogens and a nominal functionality of 2 to 8. In a yet further embodiment, the second initiator comprises species having a nominal functionality of 2 to 3 and the ratio of the first and second initiators is selected such that the polyether polyol has a molar average functionality from about 2.2 to about 4.

The process may include co-initiation of the polyol or polyols may be initiated separately and used alone or in combination.

The invention further provides processes and polyols wherein the first initiator comprises a plurality of species having nominal functionality of six or greater. It is another object of the invention to provide a process wherein about 5 to 100 wt %, preferably 10 to 100%, most preferably 20 to 100%, of the polyol comprises alkoxylated species of nominal functionality greater than 8. The upper limit of 100% can advantageously be lowered as necessary to improve processability.

The invention also provides process for making polyols for flexible foam including use of at least one second initiator having a nominal functionality of 2 to 3. It is a further object of the invention to provide a process wherein about 5 to 50%, optionally 7 to 40% and preferably 10 to 30 wt % of the polyol are alkoxylated species of nominal functionality greater than 8.

In a preferred embodiment, the first initiator comprises a hydrogenated starch hydrolysate (HSH) and/or the second initiator comprises glycerin and/or diethylene glycol (DEG).

It is also an object of the invention to provide polyether polyols and polyurethane foams that are the reaction products of the above-described processes.

DETAILED DESCRIPTION OF A PREFERRED EMBODIMENT

Figure 1:
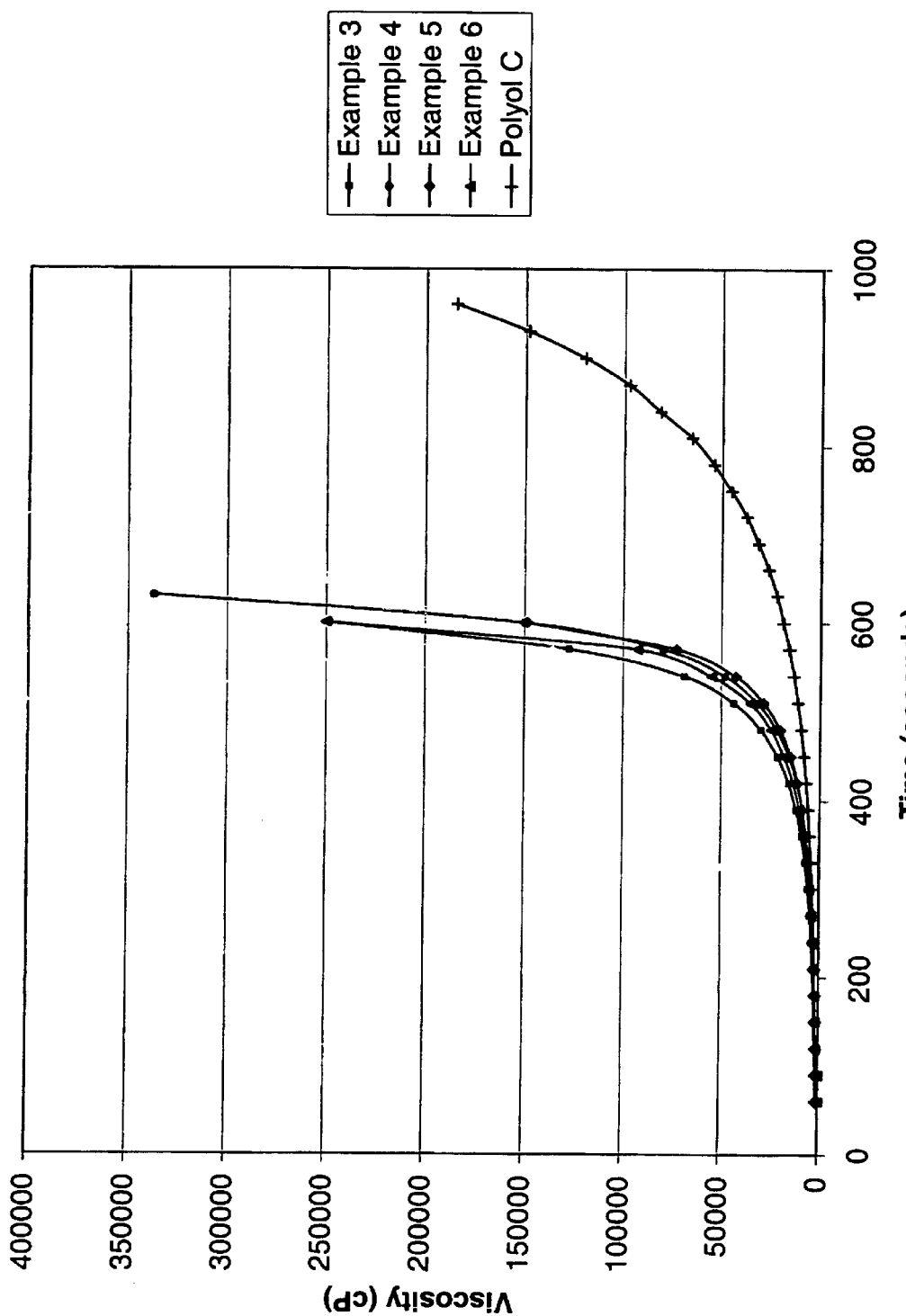
FIG. 1 is a viscosity v. time graph of gel viscosity profiles using polyols of the invention and two comparative polyols.

Polyether polyols are generally alkoxylation products of various initiators reacted with oxirane or alkyl-, aryl-, or aralkyl-substituted oxiranes in the presence of a catalyst. An overview of polyols, their preparation, properties and applications in polyurethane chemistry is given in, for example, "Kunststoff-Handbuch", Volume 7, Polyurethane, 3rd edition, 1993, edited by G. Oertel, Carl Hanser Verlag, Munich.

Initiator molecules having active hydrogens that will react with alkylene oxides to undergo polymerization are selected to provide the polyol with a desired functionality and reactivity. Examples of active hydrogens, which are well known in the art, include the hydrogen on functional groups such as —OH, —NHR, —SH, —COOH, and —C(O)NHR, where R is hydrogen, alkyl, aryl, or aralkyl.

The polyols of Applicants' invention are based upon at least one first initiator having a relatively high functionality, i.e. a molar average functionality of greater than eight. The first initiator may be made up of molecules of a single functionality greater than eight, by way of non-limiting example, maltitol. Alternatively, the first initiator may comprise a plurality of species having functionalities different from each other. Although a first initiator including a plurality of species may be viewed simply as a blend of initiators, for purposes of this invention, first initiators may include a plurality of species and a distribution of functionalities. To the extent that the first initiator is derived from natural products, it is generally more economical to use derivatives containing different species providing a distribution of functionalities than single species derivatives, since natural products often provide a mixture of derivatives. First initiators useful in Applicants' invention preferably comprise a distribution of functionalities. It is desirable that the first initiator comprise a plurality of species having nominal functionalities of six and greater. A preferred embodiment includes species having nominal functionality ranging from 6 to 33.

It is recognized that the first initiator may include species having nominal functionality as low as two. As an example, hydrogenated starch hydrolysate generally includes traces of water and/or may contain species having lower functionality. Desirably, the traces of water amount to less than 35 wt % and typically range from 20–30 wt %. The water may be used as a diol in the polyol formation reaction or may be stripped off, as is known in the art.

The amount of high functionality species, that is species having nominal functionality of greater than eight, preferably greater than nine is believed to affect the polyol and foam characteristics. It is desirable that the amount of different species of high functionality in the first initiator be selected to provide a number of different functionalities. First initiators useful in the present invention have been found to contain approximately 78–96% of species having functionality greater than 8, approximately 36–62% of species having functionality greater than 9 and approximately 12–45% of species having functionality greater than 12.

It is desirable that the quantity of high functionality species in the polyol, that is initiator species of high functionality which have been alkoxylated, be selected to produce improved properties in the foam without making the polyol too viscous to use or filter effectively. The amount of high functionality species in the polyol typically is greater than 5%. Desirably, the high functionality species are present in the polyol in amounts ranging from about 5% to about 100%, preferably about 10% to about 100%, most preferably about 20% to about 100%. The upper limit can be lowered to improve processability. A range of about 20% to about 90% can also be utilized. For making polyols useful in manufacturing flexible foam, it is advantageous that the polyol contains high functionality species ranging from about 5% to about 50%, preferably 7% to about 40%, most preferably about 10% to about 30%. For rigid foam polyols, where high functionality is beneficial, ranges of high functionality species in the initiator as close to 100% as practicable, without adversely affecting the polyol or the foam characteristics are preferred.

By way of non-limiting example, suitable first initiators are hydrogenated oligo-saccharides, hydrogenated polysaccharides and hydrogenated starch hydrolysates. Other first initiators having a nominal functionality of greater than eight are also considered suitable first initiators, it is preferred that first initiators also contain an appropriate range of species of different functionality, as described herein, A polyol according to one embodiment of Applicants' invention is based upon a first initiator containing species with functionality greater than eight and selected from the class of substances known as hydrogenated starch hydrolysates (HSH). Hydrogenated starch hydrolysates generally comprise sorbitol, maltitol and additional hydrogenated oligo- and poly-saccharides. Advantageously, the first initiator has a molar average functionality ranging between greater than eight and less than 18. In a second embodiment, the first initiator has a molar average functionality of about 9–11, preferably about 10. In another embodiment, the first initiator has a molar average functionality of about 12–14.

The range of functionalities of species in the first initiator used to prepare polyols of the invention contributes to the improved foam properties achieved, as compared to similar foams made using glycerin/sorbitol- or glycerin/sucrose-based polyols. One embodiment uses, as a first initiator, a hydrogenated starch hydrolysate having species of nominal functionality ranging from 6 to 27 and a molar average functionality of about 10. Analysis of this HSH shows that it is comprised of species having nominal functionality of 6, 9, 12, 15, 18, 21, 24, and 27. Another HSH, useful in a second embodiment of the invention, additionally comprises species of 30 and 33 nominal functionality and has a molar average functionality of approximately 13.

Hydrogenated starch hydrolysates are natural materials derived from corn, wheat and other starch producing plants. To form hydrogenated starch hydrolysate, the starch polymer molecule is broken into smaller oligomers at the ether bond between glucose rings, which produces glucose, maltose and higher molecular weight oligo- and poly-saccharides. The resulting molecules, having hemiacetal glucose rings as end units, are then hydrogenated to sorbitol, maltitol and hydrogenated oligo-and poly-saccharides. Hydrogenation of the starch hydrolysate enables slightly higher functionality to be obtained. Desirably, hydrogenation also reduces or eliminates the end units' tendency to form the hydroxyaldehyde form of glucose. Hydrogenation thus results in less side reactions of the initiator, e.g. aldol condensation and Cannizzaro reactions, and smaller amounts of by-products in the polyol.

Hydrogenated starch hydrolysates are commercially available and inexpensive, and provide the added benefit of being a renewable resource. Examples of commercially available hydrogenated starch hydrolysates include Lycasin®, Polysorb® RA 1000 and Maltisorb® from Roquette. In addition to sorbitol and maltitol, these syrups contain higher molecular weight hydrogenated saccharide species.

Optionally, one or more second initiator molecules may be selected from suitable initiator molecules containing active hydrogens, including but not limited to water, alcohols, amines, mercaptans, carboxylic acids, and carboxylic amides, or mixtures thereof. Suitable second initiators are those compatible with the first initiator. It is desirable to select second initiator molecules having lower functionality than the range of functionalities in the first initiator. Second initiators may comprise species of nominal functionality of 2–8 or mixtures thereof. Advantageously, the second initiators have nominal functionalities of 2–5 or 2–4 or preferably 2–3. For flexible foams, at least one of the second initiators has a nominal functionality of 2–3. If second initiators are used, it is desirable to use substances which are miscible and which reduce the viscosity of the mixture of initiators.

First and second initiators, or polyols made from first and second initiators, are combined in ratios selected to achieve a target functionality for a particular polyol component. By way of non-limiting example, a first initiator having a molar average functionality of eleven may be combined with a three nominal functionality second initiator in a 50:50 ratio and then alkoxylated to obtain a polyol component having a molar average functionality of approximately seven. For flexible foam, preferred polyol component functionalities range from about 2.2 to about 4. Polyol components in this range may be obtained using the polyols of Applicants' invention by combining, by way of non-limiting example, a first initiator having a molar average functionality of eleven with a three nominal functionality second initiator in a ratio of about 1:7.

Suitable initiators include alcohols or mixtures of alcohols, which can be either monomeric or polymeric, and can be monofunctional or polyfunctional. Monomeric alcohols include diols, triols, and higher functional alcohols, and may be aliphatic or aromatic. Non-limiting examples include diols such as ethylene glycol, propylene glycol, 1,3-propanediol, neopentylglycol, 1,2-butanediol, and 1,4-butanediol; triols such as glycerol, trimethylolethane, and trimethylolpropane; tetrols such as ditrimethylolpropane and pentaerythritol; and higher functional alcohols such as sorbitol, glucose, fructose, and sucrose. Other suitable alcohols are those that also contain an amino group. Initiator molecules may have both —OH and —NHR groups. Examples are alkyldialkanol amines, trialkanolamines, and dialkanolamines.

Polymeric alcohols are also useful in the present invention. Polymeric alcohols are polymers that have hydroxy functionality. The most commonly used polymeric alcohols are the oligomers and polymers of ethylene oxide and propylene oxide. Oligomers include diethylene glycol, triethylene glycol, tetraethylene glycol, dipropylene glycol, and tripropylene glycol. Polymers include polyethylene glycol and polypropylene glycol. Other polymeric alcohols would include any polyether polyol made by polymerization of an alkylene oxide or mixture of alkylene oxides onto an initiator molecule. That is, any polyether polyol, including those of this invention, may be used anew as an initiator molecule in a subsequent polymerization reaction to form a polyoxyalkylene.

Amines and alkylamines may also be used as initiator molecules provided that they contain at least two reactive hydrogens, preferably 2–3 reactive hydrogens. They may be monoamines, diamines, triamines, higher functional amines, or mixtures thereof. They may be aliphatic or aromatic or a mixture of both. Examples include ethylamine, aniline, dodecyl amine, decyl amine, oleyl amine, isopropyl amine, ethylene diamine, toluene diamine, propane diamine, diethylene triamine, and triethylene tetramine.

Useful carboxy functional initiator molecules include molecules with the general formula X —R—COOH, where R is an alkyl, aromatic or alkenyl group having about 8 to 20 carbon atoms, and X is an active hydrogen. Examples include adipic acid, maleic acid, succinic acid, fumaric acid, phthalic acid, dodecanedioic acid, decanedioic acid, hexadecanedioic acid, and the like, including mixtures thereof.

N-alkyl fatty amides may also be used as initiator molecules provided that they contain at least two reactive hydrogens, preferably 2–3 reactive hydrogens. In this case they have the general formula R—C(O)NHR', where R is an alkyl group having 8 to 20 carbon atoms and where R' is hydrogen or an alkyl, aryl, hydroxyalkyl, or aralkyl group having 2 to 20 carbon atoms. Examples are the fatty acid ethanolamides, which have both a —OH and a —C(O)NHR' functionality.

The alkylene oxides useful in the invention are generally oxirane or alkyl-, aryl-, or aralkyl-substituted oxiranes. In the substituted oxiranes, the alkyl, aryl, or aralkyl groups can contain from one to about 20 or more carbons. Examples include ethylene oxide, propylene oxide, 1,2-butylene oxide, 2,3-butylene oxide, isobutylene oxide, styrene oxide, and methylstyrene oxide, as well as oxiranes containing higher alkyl groups such as hexyl, octyl, decyl, dodecyl, hexadecyl, and octadecyl. Mixtures of alkylene oxides can be used, depending on the properties desired for the end use application of the compositions of the invention. The most commonly used alkylene oxides are ethylene oxide, propylene oxide, and the butylene oxide isomers; thus, they are preferred in the invention. The most preferred alkylene oxides are ethylene oxide, propylene oxide, and 1,2-butylene oxide.

The polymerization catalysts useful in the invention include the conventional base catalysts for alkylene oxide polymerization. Both organic and inorganic catalysts can be used. Conventional organic catalysts for the preparation of polyoxyalkylenes are alkali metal alkylates having from 1 to 4 carbon atoms in the alkyl radical, such as sodium and potassium methylate, sodium and potassium ethylate, potassium isopropylate and sodium butylate or mixtures thereof.

Optionally, an appropriate alternative catalyst, by way of non-limiting example, double metal cyanide complex catalysts (DMC) may be employed with modification, as is known in the art, to other reactants and reaction conditions. Double metal cyanide (DMC) catalysts useful in catalyzing polyol formation are also well known in the art. The preparation of DMC catalysts and the use of such catalysts in the polymerization of epoxides to form polyols are described in U.S. Pat. Nos. 4,472,560 and 4,477,589 to Shell Chemical Company and U.S. Pat. Nos. 3,404,109; 3,829,505; 3,900,518; 3,941,849 and 4,355,188 to General Tire and Rubber. The teachings of the foregoing patents are incorporated herein by reference.

Inorganic catalysts such as alkali metal hydroxides and alkaline earth metal hydroxides can be used. These include sodium hydroxide, potassium hydroxide, cesium hydroxide, calcium hydroxide, barium hydroxide, and strontium hydroxide. Of these, cesium hydroxide and potassium hydroxide are more preferred, and potassium hydroxide is the most preferred.

The original starting proportion of the catalyst can be about 0.002 to about 10.0 wt %, preferably from 0.01 to 5.0 wt % and most preferably about 0.01 to about 1.5 wt %, all based upon the total weight of the final product. As is conventional, higher proportions of catalyst and low reaction temperatures are used where high molecular weight polyoxyalkylenes are desired. Conversely, where low molecular weight polyoxyalkylenes are desired, low catalyst proportions are utilized at moderate to high polymerization temperatures. As polymerization progresses, the catalyst is diluted by the addition of alkylene oxide so that the percent by weight of the catalyst in the reaction vessel becomes as little as ½ to ¹/₁₀ of the original percent catalyst level.

Polyols of the invention were made by polymerizing alkylene oxides onto initiators comprising one or more first initiators, in the presence of the catalyst. The polyol may be co-initiated, that is one or more first and second initiators may be combined and the combination reacted with alkylene oxide in the presence of a catalyst to produce a polyoxyalkylene polyether polyol. Alternatively, one or more initiators may be individually alkoxylated in separate reactions and the resulting polyols blended to achieve the desired polyol component. Co-initiated and individually initiated polyols may be used alone or may be mixed together to produce a polyol component having a target hydroxyl number and functionality.

It is desirable to co-initiate HSH-initiated polyols with a second lower functionality initiator that is compatible with hydrogenated starch hydrolysate. In one embodiment of Applicants' invention, a co-initiated polyol was made using an HSH as a first initiator and a diol as the second initiator. A preferred diol is diethylene glycol. In another embodiment, Applicants made a co-initiated polyol using an HSH as a first initiator and a triol as the second initiator. A preferred triol is glycerin. In another embodiment, a polyol component was made by blending at least two polyols of different functionality to achieve a selected final functionality for the polyol component. By way of non-limiting example, a three initiator polyol was made using an HSH, glycerin and diethylene glycol as initiators. Other variations of first and second, or first, second and third initiators within the scope of the invention will be readily formulated by one of skill in the art.

In the alkoxylation reaction to make a polyol of the invention, the alkylene oxide or mixture of alkylene oxides can be added in any order, and can be added in any number of increments or added continuously. Adding more than one alkylene oxide to the reactor at a time results in a block having a random distribution of the alkylene oxide molecules, a so-called heteric block. To make a block polyoxyalkylene of a selected alkylene oxide, a first charge of alkylene oxide is added to an initiator molecule in a reaction vessel. After the first charge, a second charge can be added and the reaction can go to completion. Where the first charge and the second charge have different relative compositions of alkylene oxides, there is produced a block polyoxyalkylene. It is preferred to make block polyols in this fashion where the blocks thus formed are either all ethylene oxide or all propylene oxide or all butylene oxide, but intermediate compositions are also possible. The blocks can be added in any order, and there can be any number of blocks. For example, one can add a first block of ethylene oxide, followed by a second block of propylene oxide. Alternatively, a first block of propylene oxide may be added, followed by a block of ethylene oxide. Third and subsequent blocks may also be added. The composition of all the blocks is to be chosen so as to give the final material the properties required for its intended application.

The polyurethane foams of the present invention are generally prepared by the reaction of a polyoxyalkylene polyether polyol component with an organic polyisocyanate component in the presence of a blowing agent and, optionally, in the presence of additional polyhydroxyl-containing components, chain-extending agents, catalysts, surface-active agents, stabilizers, dyes, fillers and pigments.

One of the substances in the polyol component may be a polyol known in the art as a graft or polymer polyol, which is a polyol that also contains solid polymer particles. Graft polyols are well known to the art and are typically prepared by the in situ polymerization of one or more vinyl monomers, preferably acrylonitrile and styrene, in the presence of a polyether or polyester polyol. Methods of preparing such graft polyols may be found in U.S. Pat. No. Re 33,291, herein incorporated by reference. In one embodiment of the invention, the polyol component has a solids content of 5 to 70 wt %. It is desirable that the polymer particles are acrylonitrile:styrene with a ratio of acrylonitrile:styrene that ranges from 4:1 to 1:4.

Suitable chain-extending agents usable in the preparation of the polyurethane foams according to the present invention include compounds having at least two functional groups bearing active hydrogen atoms such as water, hydrazine, primary mono-amines and secondary diamines, amino alcohols, amino acids, hydroxy acids, diols, or mixtures thereof.

Any suitable urethane-forming catalyst may be used in the preparation of foams according to the invention, including tertiary amines such as, for example, triethylenediamine, N-methylmorpholine, N-ethylmorpholine, diethylethanolamine, 1-methyl4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408. Optionally, a blowing catalyst, such as bis (dimethylaminoethyl) ether, may be added.

A surface-active agent is often useful for production of high-grade polyurethane foam according to the present invention to prevent foam collapse and promote good cell structure. Numerous surface-active agents have been found satisfactory. Nonionic surface-active agents such as silicone polyethers are preferred. Other useful surface-active include polyethylene glycol ethers of long chain alcohols, tertiary amine or alkanolamine salts of long chain alkyl acid sulfate esters, alkyl sulfonic esters, and alkyl arylsulfonic acids.

Suitable processes for the preparation of cellular polyurethane foams are disclosed in U.S. Pat. No. Re. 24,514 together with suitable machinery to be used in conjunction therewith. When water is added to generate $CO_2$ as blowing agent, corresponding quantities of excess isocyanate to react with the water may be used. It is possible to proceed with the preparation of the polyurethane foams by a two step prepolymer technique. In the first step, an excess of organic polyisocyanate is reacted with the polyol of the present invention to prepare a prepolymer having free isocyanate groups. In the second step, the prepolymer is reacted with water and/or additional polyol to prepare foam. Alternatively, the components may be reacted in a single working step commonly known as the "one-shot" technique of preparing polyurethanes. Furthermore, instead of water, low boiling hydrocarbons such as cyclopentane, pentane, hexane, heptane, pentene, and heptene; azo compounds such as azohexahydrobenzodinitrile; CFC halogenated hydrocarbons such as dichlorodifluoromethane, trichlorofluoromethane, dichlorodifluoroethane, HCFC hydrocarbons, HFC hydrocarbons, and methylene chloride may be used as blowing agents.

The production of rigid polyurethane foam is well known in the art and comprises mixing two components A and B. Typically, the compounds which are reactive toward isocyanates, the flame retardants, the blowing agents, the catalysts and, if used, the auxiliaries and/or additives are combined to form the A component, while the polyisocyanates, if desired in admixture with flame retardants, auxiliaries and/or additives and inert, physically acting blowing agents are used as component B. The various permutations of methods for the preparation of polyurethane-containing foams are well known. For a reference to said methods and to various catalysts, blowing agents, surfactants, other additives, and polyisocyanates, see U.S. Pat. No. 4,209,609, incorporated herein by reference, and the references cited therein.

Rigid polyurethane foam compositions generally use 300–1000 molecular weight polyols with a hydroxyl number of 160–1000. Polyols known and customary for producing rigid foams are, for example polyether polyols with 2–8 hydroxyl groups per molecule preferably having a molar average functionality of at least 3, most preferably 3.5, and a hydroxyl number of greater than 100 mg KOH/g, in particular greater than 300 mg KOH/g. Polyols of Applicants' invention, useful for rigid foam applications, have greater than 6, preferably greater than 8 hydroxyl groups per molecule on average. For rigid foams, the polyol component typically also includes chain extenders and/or crosslinkers. Chain extenders used are bifunctional, low molecular weight alcohols, in particular those having a molecular weight of up to 400, for example ethylene glycol, propylene glycol, butanediol, hexanediol. Crosslinkers used are at least trifunctional, low molecular weight alcohols, for example glycerol, trimethylolpropane, pentaerythritol, sucrose or sorbitol. As polyisocyanates, use is made of the customary and known aliphatic and in particular aromatic polyisocyanates. Rigid foam compositions typically use a 100–300 NCO index.

To produce the flexible polyurethane foams of the invention, organic, modified or unmodified polyisocyanates are reacted with the isocyanate-reactive compounds comprising the polyether polyols of the present invention in the presence of blowing agents, and, optionally, catalysts flame retardants, auxiliaries and/or additives. Reaction temperatures range from about 0 to 100° C., preferably from 15 to 80° C. Suitable molar ratios of polyisocyanate to isocyanate-reactive species are from about 0.5 to about 2, preferably from about 0.8 to about 1.3. Generally, about one reactive hydrogen atom is present in the compounds which are reactive toward isocyanates per NCO group and, if water is used as blowing agent, the molar ratio of equivalents of water to equivalents of NCO groups is 0.5–5:1, preferably 0.7–0.95:1 and in particular 0.75–0.85:1. Flexible foam typically uses polymer polyol as part of the overall polyol content in the foam composition, along with a polyol component of 500–3000 average equivalent weight and hydroxyl number of 20–100. It is preferred that the molar average functionality of the polyol used to make flexible foam ranges from about 2.2 to about 4.

The flexible polyurethane foams may be advantageously produced by the one-shot process by mixing two components A and B. Similar to rigid foam formulations, the compounds which are reactive toward isocyanates, the flame retardants, the blowing agents, the catalysts and, if used, the auxiliaries and/or additives are combined to form the A components, while the polyisocyanates, if desired in admixture with flame retardants, auxiliaries and/or additives and inert, physically acting blowing agents are used as component B. The reaction mixtures can be foamed in open or closed molds and also to give block foam.

The following Examples are non-limiting illustrations of the subject matter of Applicants' invention.

EXAMPLE 1

Applicants produced Polyol A according to the invention by co-initiating with glycerin and a commercially available hydrogenated starch hydrolysate syrup (HSH1) comprising approximately 75 wt % sorbitol, maltitol and hydrogenated oligo- and poly-saccharide species, the remaining approximately 25 wt % being water. HSH1, the first initiator, had a molar average functionality of about 10 and had species ranging in nominal functionality from 6–27 after removal of the water. 96 wt % of species had a nominal functionality of greater than eight and 36 wt % of species had nominal functionality greater than nine. The ratio of HSH1 to glycerin was 45:55. Polyol A had an ethylene oxide cap of approximately 19 wt % of the polyol and a hydroxyl number of 29.3 and was produced according to the following method: Charge the desired amount of aqueous HSH, second initiator, and aqueous potassium hydroxide to a stainless steel reactor. Heat the mixture with stirring to 105° C. Apply a vacuum of 10 mm Hg and remove the water of solution. Add an amount of propylene oxide to reach a hydroxyl number of about 250 to 500 (equivalent weight of about 200 to 100). Add a portion of the first polyol product to a second pressure reactor. Heat to 105° C. and add an amount of propylene oxide followed by an amount ethylene oxide to reach the desired hydroxyl number and desired level of ethylene oxide end block for the final product. Remove the potassium hydroxide catalyst and stabilize with the desired amount of BHT.

EXAMPLE 2

Polyol B, a polyol of the invention, was made according to the procedure recited in Example 1. The first and second initiators were HSH1 and diethylene glycol (DEG), respectively. The ratio of HSH1 to DEG was 20:80. Polyol B had an ethylene oxide cap of approximately 19 wt % of the polyol.

EXAMPLE 3

Polyol A and a glycerin-initiated polyol having a nominal functionality of three (Polyol C) were combined at a ratio of parts by weight of Polyol A to Polyol C of 40 to 60 to form another polyol of the invention (hereinafter referred to as "Example 3 Polyol"). The resulting polyol had a molar average functionality of approximately 4.2

EXAMPLE 4

Polyols A, B and C were combined at a ratio of A:B:C of 30:50:20 to form yet another polyol of the invention (hereinafter referred to as "Example 4 Polyol"). The majority of the Example 4 Polyol is made up of HSH1/DEG initiated polyol, which results in a lower molar average functionality of this polyol as compared to Example 3. The molar average functionality of the Example 4 Polyol is approximately 3.0.

EXAMPLE 5

Polyols A, B and C were combined at a ratio of A:B:C of 35:25:40 to form another three initiator polyol according to the invention (hereinafter referred to as "Example 5 Polyol"). As compared to Example 4, the polyol of this example had the amount of glycerin-initiated polyol doubled, the amount of HSH1/glycerin initiated polyol increased slightly, and the amount of HSH1/DEG polyol reduced by approximately 50%. The change in proportions of Polyols A, B, and C resulted in a molar average functionality of about 3.2.

EXAMPLE 6

A glycerin/sorbitol-initiated polyol (Polyol D) was selected and foam made therefrom for comparison with the foams of the invention.

Gel viscosity profiles of Polyol C and each of the polyols of Examples 3,4, 5 and 6 were measured using a Brookfield DV-III rheometer equipped with an LV-4 spindle. Each material studied was run in triplicate according to the following procedure. 400 g of polyol and 0.8 g of Dabco 33LV were added to a 1000 ml plastic beaker, and mixed for 2 minutes at 2000 revolutions per minute (rpm) using a 2 inch impeller and an electric mixer. 125 g of the mixture was then added to each of three 250 ml plastic beakers, and tightly covered with aluminum foil. The three samples were than placed in a 25° C. water bath for at least 2 hours. Each beaker was then placed in an insulated jacket and stirred for 10 seconds. While stirring, a pre-weighed amount equal to 100 index of TDI was added to each sample and the mixture was stirred for 20 seconds. The rheometer spindle was then inserted into the reaction mixture and data collected for an initial spindle speed of 20 rpm down to 1 rpm. The mixer was slowed by one revolution per minute each time the measured torque reached 50% of the full torque of the mixer. Viscosity and temperature data were recorded every 30 seconds; the results are graphically displayed in FIG. 1.

The gel viscosity profiles of Examples 3–6 show rapid increases in viscosity of the reaction mixture beginning at approximately 500 seconds. The gel viscosity profile of Polyol C, the triol-based polyol of the prior art, shows significantly lower viscosity at 500 seconds. The relative slopes of the curves for Examples 3–6 and Polyol C indicates a slower overall viscosity increase for Polyol C foams. Similar viscosity profiles for polyols of the invention (Examples 3–5) and glycerin/sorbitol initiated polyols (Example 6) are seen. Increases in viscosity are known in the art to correlate to increases in molecular weight in polyurethane foam. This data supports the conclusion that polyols of the invention react at a rate similar to glycerin/sorbitol initiated polyols and have a much faster rate of molecular weight build than traditional triol-based polyols.

Machine-made foams for evaluation were prepared with the polyols of Examples 3–6 using commercial foaming equipment. The foams were made according to the reactant ratios recited in Table 1. Water was used as the chemical blowing agent in the foams made from Examples 3–6.

The substances listed under "Polyol Component" in Table 1 were pre-blended to form a resin that was then aged 24–72 hours prior to foaming. Mixing pressures of 2000 psi were maintained for both resin and isocyanate. Foam was poured into a 15×15×4 in$^3$ rectangular heated mold at 65° C. and was demolded after 6 minutes.

TABLE 1

| Example | 3 | 4 | 5 | 6 Comparative |
|---|---|---|---|---|
| Initiator | HSH1/ Glycerin | HSH1/ Glycerin/ DEG | HSH1/ Glycerin/ DEG | Sorbitol/ Glycerin |
| POLYOL COMPONENT | | | | |
| Example 3 Polyol | 77.5 | | | |
| Example 4 Polyol | | 77.5 | | |
| Example 5 Polyol | | | 77.5 | |
| Polyol D | | | | 77.5 |
| Polyol E (Graft) | 22.5 | 22.5 | 22.5 | 22.5 |
| DEOA, LF | 1.4 | 1.4 | 1.4 | 1.4 |
| Water | 4.07 | 4.07 | 4.07 | 4.07 |
| NIAX A-1 | 0.08 | 0.08 | 0.08 | 0.08 |
| DABCO 33LV | 0.35 | 0.35 | 0.35 | 0.35 |
| DC-5043 | 1.00 | 1.00 | 1.00 | 1.00 |
| Total parts by weight | 106.90 | 106.90 | 106.90 | 106.90 |
| ISOCYANATE COMPONENT | | 100 Index | | |
| TDI (Parts by Wt.) | 48.52 | 48.57 | 48.54 | 48.80 |

TABLE 2

IDENTIFICATION OF SUBSTANCES IN POLYOL COMPONENT

Polyol C is a propylene oxide polyether polyol initiated on glycerin and having a 19 wt % ethylene oxide cap and a nominal functionality of 3.0.
Polyol D is a propylene oxide polyether polyol initiated on glycerin and sorbitol in a 63:37 ratio, with a 19 wt % ethylene oxide cap and a nominal functionality of 3.8.
Polyol E is a graft polyol comprising 45 wt % solids in a 35 OH No. glycerin initiated polyol having an approximately 19 wt % ethylene oxide cap. The ratio of acrylonitrile: styrene is 1:1.
DEOA, LF is commercially available diethanolamine-based crosslinker having 15 wt % water.
NIAX A-1 is a commercially available catalyst obtained from Crompton.
DABCO 33LV is a commercially available catalyst obtained from Air Products.
DC-5043 is a commercially available silicone polyether surfactant obtained from Air Products.

Samples of the foams resulting from Examples 3–6 were tested for resistance to crush. The foams were removed hot from the mold and subjected to crushing using a force-to-crush (FIC) machine equipped with an indenter foot identical to that specified for the IFD test on flexible foam (ASTM D3574). The machine compressed the foam to 50% compression each cycle for ten cycles and measured the force required at each cycle. Cycle time was approximately 10 seconds. The test simulates a commercial crush operation in which flexible foam is crushed to open the cells. Table 3 contains the results of the crush test.

TABLE 3

| Example | | 3 | 4 | 5 | 6 Comparative |
|---|---|---|---|---|---|
| Initiator | Trial | HSH1/ Glycerin | HSH1/ Glycerin /DEG 1 | HSH1/ Glycerin/ DEG 2 | Sorbitol/ Glycerin |
| Force to Crush- (Pounds force) | 1 | 444 | 431 | 404 | 441 |
| | 2 | 326 | 290 | 295 | 327 |
| | 3 | 239 | 197 | 206 | 237 |
| | 4 | 174 | 131 | 143 | 169 |
| | 5 | 130 | 94 | 104 | 126 |
| | 6 | 102 | 72 | 80 | 98 |
| | 7 | 78 | 58 | 64 | 77 |
| | 8 | 66 | 47 | 52 | 61 |
| | 9 | 58 | 42 | 45 | 53 |
| | 10 | 49 | 37 | 38 | 47 |

The crush test results show that the foam of the invention requires substantially the same as or less force to crush than Example 6, a foam formulation based upon glycerin/sorbitol initated polyol. Less force to crush is preferred in making flexible foams, provided that the foam is substantially stable, that is the foam has good bulk and sheer stability. Foams that require too high a force to crush can lead to foam tearing during the crush operation. This is a particular problem where the foam contains inserts, e.g. metal inserts.

Samples of the foams made from Examples 3–6 were tested for physical properties after being run twice through a roller crusher with a one-inch opening. The foams were tested for density, hardness, tensile strength tear strength, elongation, resilience and compression set. All parameters were tested according to ASTM method D 3574 except for the wet compression set metho. The wet compression set method used is the same as JIS K-6400, Japanese Industry Standards. The method will be included as test L of ASTM method D 3574 in 2002. Briefly, the method is exposure at 50° C., 95% relative humidity for 22 hours followed by a 30-minute recovery period. Table 4 represents results of above-described physical tests performed on the foams.

TABLE 4

| Example | | 3 | 4 | 5 | 6 Comparative |
|---|---|---|---|---|---|
| INITIATOR | | HSH1/ Glycerin | HSH1/ Glycerin/ DEG | HSH1/ Glycerin/ DEG | Sorbitol/ Glycerin |
| Core Density | lb/ft$^3$ | 1.85 | 1.79 | 1.82 | 1.82 |
| Original 25% Indentation Force Deflector | lb/ft | 25.36 | 24.85 | 24.88 | 25.94 |
| Original 65% Indentation Force Deflector | lb/ft | 69.67 | 68.24 | 69.02 | 70.16 |
| Original Peak Tensile | lb/in$^2$ | 18.68 | 17.77 | 18.91 | 16.75 |
| Original Break Elongation | % | 82.2 | 84.5 | 87.4 | 75.4 |
| Original Block Tear | PPI | 1.07 | 1.26 | 1.21 | 1.08 |
| Falling Ball Core Resilience | % | 62 | 65 | 63 | 65 |
| Original 50% | % | 11.8 | 11.9 | 13.4 | 9.8 |

TABLE 4-continued

| Example | | 3 | 4 | 5 | 6 Comparative |
|---|---|---|---|---|---|
| Original Set Humid Age 50% | % | 15.6 | 18.0 | 16.5 | 15.7 |
| Original Set Cell Size | Microns | 812 | 809 | 833 | 845 |

The physical tests show that foams made from the polyols of Applicants' invention have properties similar to those of a glycerin/sorbitol initiated polyol, but have improved tensile, tear and elongation properties.

EXAMPLE 7

Applicants produced higher functionality polyols of lower equivalent weight for use in rigid foam applications by initiation with HSH1 according to the following procedure: Charge the desired amount of aqueous HSH, a portion of final product, and aqueous potassium hydroxide to a stainless steel reactor. Heat the mixture with stirring to 110° C. Apply a vacuum of 10 mm Hg or less and remove the water of solution. Add an amount of oxide to reach a hydroxyl number of about 250 to 1000 (equivalent weight of about 200 to 50). Remove the potassium hydroxide catalyst and stabilize with BHT. For Example 7, only enough propylene oxide to make about a 350 OH No. polyol was added. The molar average functionality of the rigid polyol was 9.6. A second initiator was not used. A heel of final product was used to improve processability. For the first batch, a low molecular weight sorbitol polyol was charged to the reactor as a substitute for the heel of final product. The amount of sorbitol in the initial reaction mixture was low (94% HSH, 6% sorbitol). Eventually this residual sorbitol starting material is an insignificant portion of the final product since a heel from the prior reaction is used to make the subsequent polyol resulting, after several batches, in the production of a product which is essentially 100% HSH initiated.

EXAMPLE 8

Another polyol of the invention is made by the same procedure as Example 1, but HSH1 is used as the first initiator with less than 100% of the water being stripped off prior to reaction with the epoxide. A variety of polyols having different functionalities can result from this process depending upon the amount of water removed.

The foregoing invention has been described in accordance with the relevant legal standards. Variations and modifications to the disclosed embodiment may become apparent to those skilled in the art and do come within the scope of the invention. Accordingly, the scope of legal protection afforded this invention can only be determined by studying the following claims.

What is claimed is:

1. A polyether polyol comprising the reaction product of:
a) at least one alkylene oxide;
b) at least one first initiator comprising a plurality of species having alkylene oxide reactive hydrogens, being substantially free of hydroxyaldehyde functional groups, and having a molar average functionality of greater eight;
c) optionally, at least one second initiator having alkylene oxide reactive hydrogens and a nominal functionality of 2 to 8.

2. The polyether polyol of claim 1, wherein the first initiator comprises a hydrogenated starch hydrolysate.

3. The polyether polyol of claim 2, wherein the hydrogenated starch hydrolysate comprises species each having a nominal functionality of from 6 to about 27.

4. A polyether polyol comprising the reaction product of:
a) at least one alkylene oxide;
b) at least one first initiator having alkylene oxide reactive hydrogens, being substantially free of hydroxyaldehyde functional groups, and having a molar average functionality in the range of greater than eight to less than eighteen, and
c) at least one second initiator having alkylene oxide reactive hydrogens and a nominal functionality of 2 to 8.

5. The polyether polyol of claim 4, wherein the first initiator comprises a plurality of species.

6. The polyether polyol of claim 5, wherein the plurality of species each has a nominal functionality of six or greater.

7. The polyether polyol of claim 1 or 4, wherein about 5 to 100 wt % of said polyol comprises species each having a nominal functionality greater than 8.

8. The polyether polyol of claim 1 or 4, wherein said at least one second initiator has a nominal functionality of 2 to 3.

9. The polyether polyol of claim 8 wherein about 5 to about 50 wt % of said polyol comprises species each having nominal functionality greater than 8.

10. A process for making a polyether polyol comprising the steps of:
a) providing at least one alkylene oxide;
b) providing an initiator component comprising:
i) at least one fist initiator comprising a plurality of species having alkylene oxide reactive hydrogens, said first initiator being substantially free of hydroxyaldehyde functional groups and having a molar average functionality of greater than eight to less than eighteen; and
ii) optionally, at least one second initiator having alkylene oxide reactive hydrogens and a nominal functionality of 2 to 8;
c) reacting the at least one alkylene oxide with the initiator component to form a polyether polyol.

11. The process of claim 10, wherein the plurality of species each have a nominal functionality of six or greater.

12. The process of claim 10 wherein about 5 to 100 wt % of said polyol comprises species each having a nominal functionality greater than 8.

13. The process of claim 10, wherein step c) is conducted in the presence of a catalyst.

14. The process of claim 10, wherein said at least one second initiator has a nominal functionality of 2 to 3.

15. The process of claim 14 wherein about 5 to 50 wt % of said polyol comprises the spies each having a nominal functionality greater than 8.

16. The process of claim 10, comprising blending the initiators to form said initiator component before step c).

17. A polyether polyol comprising the reaction product of:
a) at least one alkylene oxide;
b) at least one first initiator having alkylene oxide reactive hydrogens, comprising a hydrogenated starch hydrolysate having a molar average functionality of greater than eight, and
c) optionally, at least one second initiator having alkylene oxide reactive hydrogens and a nominal functionality of 2 to 8.

18. The polyether polyol of claim 17 wherein said at least one second initiator comprises species having a nominal functionality of 2 to 3 and the ratio of the first and second initiators is selected such that the polyether polyol has a molar average functionality from about 2.2 to about 4.

19. The polyether polyol of claim 17, wherein the first initiator comprises a plurality of species each having a nominal functionality of six or greater.

20. A flexible polyurethane foam comprising the reaction product of:
   a) an organic isocyanate and
   b) a polyether polyol as claimed in any of claims 1–9 or 17–19; in the presence of
   c) a blowing agent, and
   d) optionally, catalysts, cross-linkers, surfactants, flame retardants, fillers, pigments, antioxidants and stabilizers;

wherein the polyol has a molar average functionality from about 2.2 to about 4.

21. A rigid polyurethane foam comprising the reaction product of:

a) an organic isocyanate and
   b) a polyether polyol as claimed in any of claims 1–9 or 17–19; in the presence of
   c) a blowing agent, and
   d) optionally, catalysts, cross-liners, surfactants, flame retardants, fillers, pigments, antioxidants and stabilizers.

* * * * *